United States Patent [19]

Loshaek et al.

[11] 4,111,535

[45] Sep. 5, 1978

[54] GAS-PERMEABLE LENS

[75] Inventors: Samuel Loshaek; Chah M. Shen, both of Chicago, Ill.

[73] Assignee: Wesley-Jessen Inc., Chicago, Ill.

[21] Appl. No.: 731,675

[22] Filed: Oct. 12, 1976

[51] Int. Cl.$^2$ ............................................. G02C 7/04
[52] U.S. Cl. ................................. 351/160; 264/1; 536/58; 536/65; 536/84; 536/87; 536/90; 536/100
[58] Field of Search ............ 264/1; 351/160; 536/84, 536/87, 65, 58, 90, 100, 160 H

[56]  References Cited

U.S. PATENT DOCUMENTS

| | | | |
|---|---|---|---|
| 2,241,415 | 5/1941 | Moulton | 351/163 |
| 2,242,372 | 5/1941 | Schneider | 264/DIG. 62 |
| 2,607,703 | 8/1952 | Resch et al. | 106/183 |
| 2,670,302 | 2/1954 | Malm et al. | 106/176 |
| 2,710,811 | 6/1955 | DeCroes et al. | 106/189 |
| 2,763,562 | 9/1956 | Meyer et al. | 106/179 |
| 2,942,994 | 6/1960 | Proell et al. | 536/65 |
| 3,220,865 | 11/1965 | Coney | 106/170 |
| 3,551,035 | 12/1970 | Kamath | 264/1 |
| 3,608,057 | 9/1971 | Bixler et al. | 264/1 |
| 3,622,362 | 11/1971 | Coney et al. | 106/169 |
| 3,808,179 | 4/1974 | Gaylord | 264/1 |
| 3,900,250 | 8/1975 | Ivani | 351/160 |
| 3,940,207 | 2/1976 | Barkdoll | 351/160 H |
| 3,973,561 | 8/1976 | Kane | 351/160 H |

OTHER PUBLICATIONS

Zimmerman & Lavine, Industrial Research Service's Handbook of Material Trade Names, Dover, New Hampshire, 1953, p. 560.

*Primary Examiner*—Ronald W. Griffin
*Attorney, Agent, or Firm*—Sigalos & Levine

[57]  ABSTRACT

This invention comprises a gas-permeable contact lens consisting essentially of a plasticized cellulose resin selected from a partially esterified or partially etherified cellulose polymer plasticized with a compatible plasticizer in an amount sufficient to increase the gas permeability of the cellulose resin.

10 Claims, No Drawings

GAS-PERMEABLE LENS

BACKGROUND OF THE INVENTION

Polymethylmethacrylate (PMMA) resins have long been used for the manufacture of contact lenses because of their excellent optical properties and machining and molding characteristics. A major disadvantage of PMMA resins is their very low permeability to gases such as oxygen. Since the cornea needs a continuous supply of oxygen from the air to provide for ongoing metabolic processes, the low gas permeability of the PMMA resins has necessitated lens designs which ameliorate this problem to some degree. Design changes have included reducing the diameter of the lenses in order to decrease the amount of corneal area covered by the impermeable material and shaping the back surface of the PMMA contact lens to provide for a pumping action and concomitant tear flow under the lens, the tears containing dissolved oxygen from the air.

While such designs have made possible the wearing of contact lenses, significant problems and limitations remain, both because of the inadequacy of the oxygen supply to the cornea and because the designs may produce discomfort and undesirable physiological symptoms to the wearer, frequently to a degree which makes wearing of the contact lens possible for only short periods of time or not at all.

Continued oxygen deprivation of the cornea results in edema or swelling of the cornea by excess water. This impairs vision and may result in corneal damage. In addition, while oxygen must be supplied to the cornea for its metabolic processes, carbon dioxide, a waste product of these processes must be removed. The same principles apply for providing a route for removal of carbon dioxide from the cornea as for the transport of oxygen to the cornea, when a contact lens covers the cornea.

The ideal material would provide oxygen transport to the cornea equivalent to that without a lens present on the cornea. It has been found, however, that the cornea can remain healthy with an oxygen delivery lower than this, provided the continuous lens wear time is appropriately curtailed. It has been well established, however, that the higher the gas permeability, the greater the safety margin for retaining a healthy cornea, the greater the patient tolerance for the lens and the longer the continuous wear time of the lens by the patient.

Recently, materials other than PMMA and with higher gas permeabilities have been used for contact lenses. These include soft hydrogels, soft hydrophobic polysiloxane resins, cellulose acetate butyrate (CAB) resin, and 4-methyl pentene-1 polymer. The soft materials are very flexible, CAB is less rigid than PMMA, and poly (4-methyl pentene-1) is more flexible than PMMA and can best be characterized as semi-rigid. All other factors being equal, the softer and more flexible the material, the greater its wearing comfort is likely to be, although beyond a certain softness there would be no advantage.

While these other recent materials provide a significant improvemet in gas permeability, they still do not provide an adequate gas permeability except for the polysiloxane lenses or hydrophilic lenses with very high water content. Lenses made of polysiloxane resins are not successful, however, as a contact lens material because of their high hydrophobicity, making it difficult or impossible for the tears of the eye to wet the lens, thereby causing great discomfort to the wearer. Hydrophilic lenses of very high water content are very weak. An important limitation of contact lenses made from the flexible materials is that in forming closely to the shape of the cornea, they do not correct for corneal astigmatism or other corneal conditions for which the lenses are worn as do the lenses made from more rigid materials. Further, each of the other recent materials noted above present various problems in forming, machining, and polishing the contact lens, as well as in wearing, handling and hygienic care of the lens by the patient.

SUMMARY OF THE INVENTION

Gas-permeable lenses have been found which provide for a significant transmission of oxygen and carbon dioxide through the lens, thereby removing total reliance for such transmission on lens design, which at best is inadequate; which have a gas permeability of sufficient magnitude to provide for the metabolic needs of the cornea; which have excellent optical properties and provide better visual acuity than lenses made of very flexible or soft polymers; and which can be formed by conventional machining or molding technology. The contact lenses can be worn comfortably and continuously for many hours without adverse effect on corneal physiology and patient tolerance. Contact lenses according to the present invention can be of larger diameter and may be used without producing corneal anoxia, thus permitting the reduction of lid sensation.

In addition to the foregoing, the gas-permeable contact lenses are sufficiently rigid to provide for correction of corneal astigmatism and other conditions. All of the foregoing attributes are attained while overcoming the disadvantages of conventional PMMA lenses and other rigid or semi-rigid lenses of low gas permeability.

Briefly stated, the present invention comprises a gas-permeable contact lens consisting essentially of a plasticized cellulose resin selected from a partially esterified or partially etherified cellulose polymer plasticized with a compatible plasticizer in an amount sufficient to increase the gas permeability of the cellulose resin.

DETAILED DESCRIPTION

The gas-permeable resins from which the contact lenses of the instant invention are made, consist essentially of a major portion of a polymer formed by partial esterification or etherification of a cellulose polymer and a minor portion of a compatible, relatively low molecular weight plasticizer which has the property of increasing the gas permeability of the aforesaid polymer. The plasticizer is incorporated into the cellulose ester or ether polymer by mechanical mixing and blending techniques which are conventional in the plastics industry.

The blended composition is referred to herein as the "resin". The resulting resin formed by blending the plasticizer and cellulose polymer must show an increased gas permeability without sacrifice in other physical properties essential for a suitable contact lens material. Thus, the plasticizer must not be excessively extractable from the resin by its continued exposure to the saline fluids of the eye. The light transmission of the resin must be high so that vision is not impaired and this high light transmission must be maintained after continued exposure to the fluids of the eye. The resin desirably should be machineable or moldable on conventional equipment and must accept polishing without being scratched. Even if the contact lens is made by a molding process, there are still edge finishing oprations which require the resin to be machineable. If the resin is too soft it may flow excessively during machining as the result of the frictional heat produced, causing distorted lenses with poor optics. This can be alleviated to some extent by the use of proper coolants during machining and, in fact, the useable compositions can be extended by such techniques. The contact lens formed from the resin must be stable in that it retains its dimensions, such as base curve and power, over long periods of handling and use.

Thus, it is an essential feature of the resins of the present invention, formed by combination of cellulosic polymers and plasticizers, that high gas permeability is obtained without deterioration of other essential optical and physical properties.

The cellulose polymers used must be transparent and clear in order to be suitable for optical purposes. If the ester type is used, it is preferred to use one esterified with at $C_2$ to $C_4$ fatting acid; most suitable are the partially esterified cellulosic polymers wherein the ester groups are predominantly propionate and butyrate. Generally, such cellulose ester polymers contain a minor proportion of acetate ester groups; i.e., no more than about 25% of the ester groups in the polymer, in combination with the predominant ester groups. Also suitable are the ether derivatives of cellulose, namely, ethyl cellulose and ethoxyethyl cellulose. The degree of substitution of the cellulose ester polymers, i.e., the percentage of hydroxyl groups in the cellulose polymer which are converted to ester groups, range from 20% to 60%, with the preferred range being 40% to 50%. The degree of substitution for the ethyl cellulose and ethoxyethyl cellulose range from 40% to 60% with the preferred range being 45% to 50%. These unplasticized cellulose derived polymers are hereinafter referred to as the cellulose "base" polymers or simply base polymer.

Generally, the higher the degree of substitution of the base polymer, the higher the oxygen permeability. However, as the degree of substitution increases, the polymer becomes softer and, at some point, it may be difficult to machine and polish and carry out other manufacturing operations thereon in a normal temperature environment. The useable degree of substitution range of the base polymer can be increased by the use of external coolants or a low temperature working environment during machining and other manufacturing operations. Mixtures of base polymers may be used for the purpose of optimizing a resin composition. Although the type of base resin is an important part of this invention, the method of synthesis or manufacture of such resin does not form a part of this invention. Many such resins are commercially available. Typically, such cellulose derivatives are prepared by esterification of cotton linters with a mixture of the acid and acid anhydrides concerned with an acid catalyst. For example, cellulose acetate propionate is prepared by esterifying cotton linters with propionic anhydride, acetic acid and propionic acid with a sulfuric acid catalyst.

The other essential component of the resin of the instant invention is a compatible plasticizer. A mixture of one or more plasticizers may be used to optimize the composition. Suitable plasticizers are relatively low molecular weight organic esters. Such esters include the products formed from mono or poly acids with linear or branched-chain monohydroxy alcohols or polyols. These esters may be formed by the reaction of anhydrides or acid chlorides rather than the corresponding acids. However, this invention is not intended to be limited by the method of manufacture of the ester, and the above reference to acids and alcohols is a convenient way of designating the composition. Examples of suitable aromatic mono and poly acids are benzoic acid and phthalic acid with one and two esterifiable groups, respectively. Such aromatic acids may contain other substituent groups in the aromatic ring to modify the properties of the resulting plasticizer. Examples of suitable aliphatic acids are fatty acids with less than 20 carbon atoms, e.g., acetic, propionic, butyric, lauric, palmitic, stearic and crotonic acids, dicarboxylic acids such as adipic, azeleic, and sebacic, and hydroxy-substituted carboxylic acids such a citric and ricinoleic.

Example of suitable monohydroxy alcohols are the straight and branched-chain aliphatic alcohols containing from one to 20 carbon atoms. Examples of suitable alcohols are methyl alcohol, ethyl alcohol, butyl alcohol, hexyl alcohol, n-octyl alcohol, 2-ethylhexyl alcohol, decyl alcohol, octadecyl alcohol. The alcohols may contain more than one hydroxy group, i.e., they may be polyols, examples of which are ethylene, diethylene and dipropylene glycols, butanediol and glycerol. Examples of suitable aromatic alcohols are benzyl alcohol and phenol. The esters may be mono, di, tri or higher substituted esters of multifunctional acids or multifunctional alcohols. By way of illustration, specific examples of suitable plasticizers include diethyl phthalate, dibutyl phthalate, diisobutyl phthalate, dihexyl phthalate, dioctyl phthalate, butylbenzyl phthalate, dodecyl phthalate, diethyl adipate, dibutyl adipate diisobutyl adipate, dihexyl adipate, dioctyl adipate, dibutyl azelate, dihexyl azelate, dioctyl azelate, dibutyl sebacate, dioctyl sebacate, butyl benzoate, glyceryl triacetate (triacitin), glyceryl tributyrate, dibutyl citrate, tributyl citrate, butyl stearate, and glycerylmonooleate.

Examples of plasticizers other than esters of organic acids are chlorinated paraffins; phosphoric acid derivatives such as tributyl, triphenyl and trioctyl phosphates; epoxidized vegetable oils, such as epoxidized soybean oil, and polymeric plasticizers such as poly alpha-methyl styrene and polyesters.

The preferred embodiment of this invention is based on the organic ester plasticizers previously described.

The particular plasticizer type or mixture of plasticizers used must be compatible with the cellulose base polymer. By plasticizer compatibility is meant that the resin containing the particular plasticizer appears as a single homogeneous species and the plasticizer does not substantially migrate out of the resin under use conditions. If the plasticizer is incompatible, the resin will lack high optical clarity. Some plasticizers may give an optically clear resin when in dry form, but when subjected to a simulated eye fluid, such as isotonic saline, for long periods of time, the optical clarity may diminish below the requirement for a contact lens.

The plasticizer type must be such as to not migrate out of the base cellulose polymer when immersed in the fluids of the eye. If migration occurs, the properties of the resin, such as gas permeability will revert to that of the base polymer, the resin may become embrittled, the optical parameters of the lens made from the resin will change to a point of uselessness and the migrating species might conceivably irritate the eye.

The particular plasticizer or mixture of plasticizers used must provide the increased gas permeability at concentrations which do not deteriorate other desirable properties, as further discussed below.

As to amount of plasticizer to be added to the base polymer to produce the resin composition, it has been found that increasing the plasticizer content usually increases the gas permeability. With increasing plasticizer concentrations, the resulting resin increases in softness and at some point becomes unsuitable for the manufacture of contact lenses. The range of acceptable plasticizer concentration may be increased by modifications in manufacturing techniques. An excessive amount of plasticizer in the resin may also decrease the stability of the lens made therefrom. Thus, the optical parameters such as base curve radius and power may change due to cold flow of the lens material. The contact lens in the eye is on a temperature environment of about 37° C. The lens material must resist any temporary or permanent optical distortion at this temperature, such as may be caused by an excessive amount of plasticizer. It is evident, therefore, that the amount of plasticizer used must be optimized to give the maximum gas permeability possible, while minimizing the undesirable consequences of an excessive plasticizer concentration.

Generally, it has been found that 3% to 25% of plasticizer based on the weight of the final resin produces the desirable results while 8% to 20% is the preferred range when using the plasticizers of the present invention.

The plasticizer and resin are combined with conventional plastics processing equipment. Typically, the cellulose base polymer is in powder form. This powder and the plasticizer are first mixed together until homogeneous, in a ribbon blender or ball mill or sigma blade mixer or equivalent mixing equipment. During this operation adjuvants such as antioxidants or lubricants may be added as a processing aid for the subsequent manufacturing steps. This homogeneous mixture is then intensively mixed at high temperature in a plastic extruder or Banbury mixer, or the like, until a homogeneous melt is formed. This melt is sheeted through rolls and diced to form cubes or pellets. Alternatively, the melt from the extruded directly into strands which are cut into small cylinders or pellets.

The aforementioned pellets can be used for preparation of the contact lenses of this invention. The pellets may be formed into cylindrical rod form or sheet form on a plastic extruder. From these rods or sheets, small cylinders are cut to give so-called lens bonnets from which the contact lens can be machined. Alternatively, the pellets may be directly molded into bonnet form on a plastics blow molding machine, or the contact lens may be directly molded. In the latter instance, a large number of molds is required to cover the required range of base curve radii and powers. The method of forming the plastic, preparing bonnets and machining or molding lenses are conventional. Machining coolants or externally controlled temperature in the working environment may be used to extend the range of resin softness that can be used.

The essential feature of the resins of this invention and the contact lenses made therefrom is that the gas permeability be increased over that of the cellulose base polymer. Oxygen permeability is measured by intervening the lens as part of the electrolyte in a platinum-silver chloride electrolytic oxidation-reduction cell. The current flow through this cell is proportional to the amount of oxygen passing through the lens which is reduced at the platinum electrode. The apparatus and method have been described by Fatt in the book *Polarographic Oxygen Sensor*, CRC Press, Inc., 1976. In the examples that follow, the instant inention will be demonstrated by measurement of oxygen permeability on contact lenses or films made from various resin compositions.

The following examples are given to illustrate the best modes for carrying out the present invention in which the plasticizers used are of commercial grade, but are not to be construed as restricting the scope thereof.

EXAMPLES 1-3

A cellulose acetate ester base polymer comprising about 3% acetate ester groups, and about 45% propionate ester groups was used. The base polymer is blended with different amounts of dihexyl azelate. This resin was used in the form of molding pellets which were then molded on a conventional injection molding machine into eight cylinder bonnets of 0.75 inch in diameter and 0.2 inch thickness. Contact lenses of about 0.2 mm center thickness were made from the bonnets and oxygen permeability constants were measured. The results are shown below:

| Example No. | Weight % Dihexyl Azelate[1] Plasticizer | Permeability Constant[2] |
|---|---|---|
| 1 | 0 | $3.4 \times 10^{-11}$** |
| 2 | 3* | $4.3 \times 10^{-11}$ |
| 3 | 12* | $6.9 \times 10^{-11}$ |

Footnotes:
[1] Weight percent of dihexyl azelate plasticizer based on the total weight of base resin plus plasticizer.
[2] Units $\frac{cm^2}{sec} \quad \frac{ml\ O_2}{ml\ mm\ Hg}$
*The 12% plasticized resin is available under the trade name Tennite Propionate 350A, flow grade H2 and the 3% plasticized resin as Tennite Propionate 350A, flow grade H6.
**The permeability constant for 0% dihexyl azelate was obtained by extrapolation.

Examples 1 to 3 show the effect of increasing the amount of plasticizer on the permeability. On this same scale, a polymethyl methacrylate lens would give a permeability constant of $0.1 \times 10^{-11}$ or less. The resin of Example 3 gives a good compromise between high permeability, machineability and stability. Contact lenses made from the resin of Example 3 were tested clinically on a patient with good results.

EXAMPLES 4-7

The procedure of Examples 1 to 3 was repeated except that the base resin used was a cellulose ester comprising about 38% butyrate ester groups and about 13% acetate ester groups, and the plasticizer was dioctyl adipate. The results are shown below:

| Example No. | Weight % Dioctyl Adipate[1] | Permeability Constant[2] |
|---|---|---|
| 4 | 0* | $4.0 \times 10^{-11}$ |
| 5 | 5* | $5.8 \times 10^{-11}$ |
| 6 | 17* | $9.5 \times 10^{-11}$ |
| 7 | 21* | $13.9 \times 10^{-11}$ |

Footnotes:
[1] Weight % dioctyl adipate (di(2-ethylhexyl) adipate) plasticizer based on the total weight of base resin plus plasticizer.
[2] Units: $\frac{cm^2}{sec} \quad \frac{ml\ O_2}{ml\ mm\ Hg}$
*The resins shown starting in order from 0% are available under the trade names Tennite 264A, flow grade H4, 264A, flow grade H2, 264A, flow grade MS and 264A, flow grade S2.

The preferred cellulose ester base resins contain 30% to 50% of the major substituent ester group, i.e., propionate or butyrate groups and 0% to 15% of the minor substituent ester group, i.e., the acetate group. The preferred plasticizer content of the final resin varies with the type of plasticizer and the type of base resin, but preferably gives a permeability constant of at least $5 \times 10^{-11}$ (cm$^2$/sec) (ml O$_2$/ml mm Hg).

EXAMPLES 8–10

The procedure of Examples 1 to 3 was repeated except that the base resin is a cellulose ether (ethyl cellulose) comprising 48% ethyl ether groups and the plasticizer used was triglyceryl acetate (triacetin). Also, the base resin was used in powder form and films of about 0.2 mm. thickness were cast from a solution of the powdered resin in benzene. Permeability measurements were made on these dried films. The results are shown below:

| Example No. | Weight % Triacetin Plasticizer[1] | Permeability Constant[2] |
|---|---|---|
| 8* | 0 | $5.7 \times 10^{-11}$ |
| 9 | 10 | $6.9 \times 10^{-11}$ |
| 10 | 30 | $6.0 \times 10^{-11}$ |

Footnotes:
[1] Weight % same basis as Examples 1–7.
[2] Same units as in previous examples.
*The resin with 0% plasticizer is available from Hercules Inc. as Number N-50.

EXAMPLES 11–14

The procedure of Examples 8 to 10 was repeated except that the ethyl cellulose base resin used was of 49% ethoxyl content and the plasticizer used was dibutyl phthalate. The results are shown below:

| Example No. | Weight % Dibutyl Phthalate Plasticizer[1] | Permeability Constant[2] |
|---|---|---|
| 11 | 0* | 6.9 |
| 12 | 5 | 6.9 |
| 13 | 10 | 7.8 |
| 14 | 20 | 7.3 |

Footnotes:
[1] Weight basis is the same as in Examples 8 to 10.
[2] Units are the same as in previous examples.
*The base resin with 0% plasticizer is available from Dow Chemical Co. under the number ethyl cellulose, Dow SP 100.

In Examples 8 through 14 there appears to be a maximum in the permeability constant at about 10% plasticizer concentration.

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A transparent optically clear gas-permeable contact lens consisting essentially of a plasticized cellulose resin selected from a partially esterified or partially etherified cellulose polymer plasticized with a compatible plasticizer in an amount sufficient to increase the oxygen permeability of the cellulose resin at least about 13% higher than that of the unplasticized cellulose resin but below that at which the optical and physical properties of the lens are substantially adversely affected.

2. The contact lens of claim 1 wherein the cellulose polymer is a partially esterified cellulose polymer in which from about 20% to 60% of the hydroxyl groups in the polymer are esterified with a C$_2$ to C$_4$ fatty acid.

3. The contact lens of claim 1 wherein the partially esterified cellulose polymer is selected from cellulose acetate butyrate, cellulose acetate propionate, or mixtures thereof, in which 40% to 50% of the hydroxyl groups in the polymer are esterified and in which the predominant ester group in each polymer is, respectively, butyrate and propionate.

4. The contact lens of claim 1 wherein the plasticizer is selected from low molecular weight organic esters, chlorinated paraffins, phosphoric acid derivatives, epoxidized vegetable oil, polymeric plasticizers, and mixtures thereof.

5. The contact lens of claim 1 wherein the polymer is selected from cellulose acetate butyrate, cellulose acetate propionate, or mixtures thereof, in which about 40% to 50% of the hydroxyl groups in the polymer are esterified and in which the acetate ester group comprises no more than about 25% of the ester groups in the polymer, and in which the plasticizer is a low molecular weight organic ester formed from mono or poly acids with linear or branched-chain monohydroxy alcohols or polyols; the plasticizer being used in an amount of from about 3% to 25% by weight based on the total weight of plasticizer and polymer.

6. The contact lens of claim 1 wherein the cellulose resin is a partially etherified cellulose polymer selected from ethyl cellulose, ethoxyethyl cellulose, or mixtures thereof, in which from about 40% to 60% of the hydroxyl groups in the polymer are etherified.

7. The contact lens of claim 6 wherein the plasticizer is selected from low molecular weight organic esters, chlorinated paraffins, phosphoric acid derivatives, epoxidized vegetable oils polymeric plasticizers, and mixtures thereof.

8. The contact lens of claim 6 wherein 45% to 50% of the hydroxyl groups are etherified and the plasticizer is a low molecular weight organic ester formed from mono or poly acids with linear or branched-chain monohydroxy alcohols or polyols; the plasticizer being used in an amount of from about 3% to 25% by weight, based on the total weight of plasticizer and polymer.

9. The contact lens of claim 1 wherein the cellulose polymer is cellulose acetate propionate and the plasticizer is dihexyl azelate, said plasticizer being present in an amount from about 3% to 25% by weight based on the total weight of plasticizer and polymer.

10. The contact lens of claim 1 wherein the cellulose polymer is cellulose acetate butyrate and the plasticizer is di(2-ethylhexyl)adipate, said plasticizer being present in an amount from about 3% to 25% by weight based on the total weight of plasticizer and polymer.

* * * * *